A. C. RUTZEN.
COMBINED SUPPORT AND CAMERA.
APPLICATION FILED OCT. 20, 1916.
1,246,328.
Patented Nov. 13, 1917.
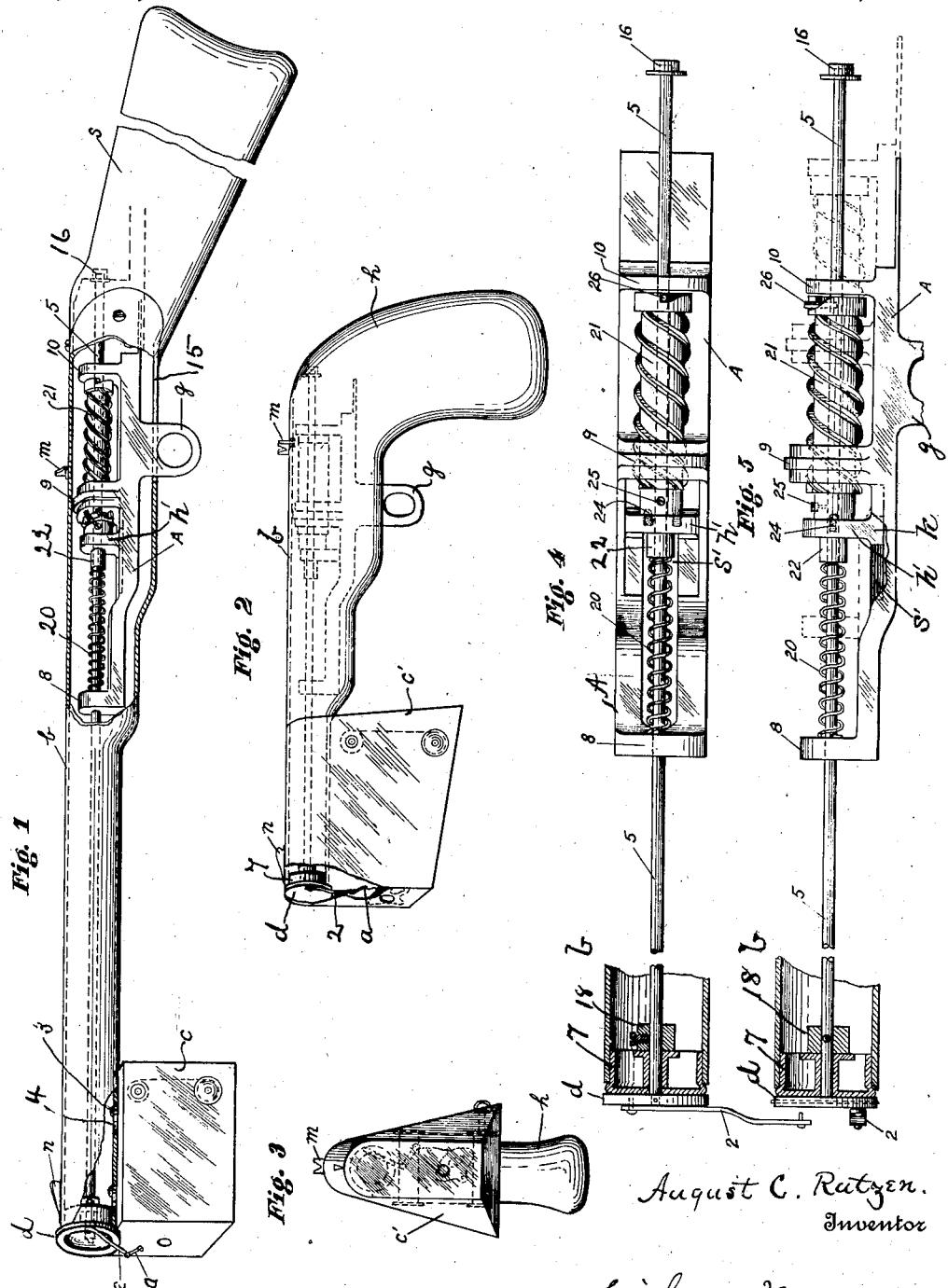
August C. Rutzen.
Inventor
By Fisher & Moser
Attorney

UNITED STATES PATENT OFFICE.

AUGUST C. RUTZEN, OF CLEVELAND, OHIO.

COMBINED SUPPORT AND CAMERA.

1,246,328.

Specification of Letters Patent. Patented Nov. 13, 1917.

Application filed October 20, 1916. Serial No. 126,671.

*To all whom it may concern:*

Be it known that I, AUGUST C. RUTZEN, citizen of the United States, residing at Cleveland, in the county of Cuyahoga and State of Ohio, have invented certain new and useful Improvements in Combined Supports and Cameras, of which the following is a specification.

This invention herein consists in a combined rifle and camera, or what may be termed a rifle camera. In this combination the support for the camera consists of a stock and barrel like any ordinary gun or rifle, or of the form of a pistol, and both forms are adapted to be handled and sighted and fired after the manner of such weapons generally. The camera is swung from the extremity of the barrel in either case and is in actuating relations from or with the trigger, so that when the trigger is pulled the camera shutter will be operated and an instantaneous or time exposure made, all substantially as shown and described and particularly pointed out in the claims.

In the accompanying drawings, Figure 1 is a side elevation of the complete article, the support or rifle being partially sectioned in its body portion to show internal parts, and Fig. 2 is a modification of Fig. 1, in that it is of the pistol rather than of the rifle style of support. Fig. 3 is a front end elevation of Fig. 2. Fig. 4 is a plan view of the inside mechanism removed from the barrel of Fig. 1, and Fig. 5 is a side elevation thereof.

The character of the invention is obvious from the foregoing views, and the essential novelty therein resides in the combination of the camera with a support which can be handled, sighted and fired like a rifle or pistol, and by which a succession of pictures can be rapidly taken, as still further shown in my application bearing Serial Number 136,128, filed December 11, 1916, and concurrent herewith in the Patent Office.

As disclosed in Fig. 1, the camera support consists essentially in two parts, a tubular barrel $b$ and a stock $s$, and both fashioned after the manner of rifles generally so far as external appearance and handling are concerned, and corresponding to the usual gun trigger, and when the grip or trigger is pulled the shutter of the camera $c$ is operated through the arm $a$ as it would otherwise be by hand, though the arm in this instance substitutes the usual shutter actuating means in hand cameras. In this instance, also, the camera is suspended from the extremity of the barrel, as by headed projections 3 thereon removably engaged in slots 4 in the bottom of the barrel, or by equivalent means.

The barrel is shown as having its rear portion somewhat enlarged as compared with the forward portion and adapted to receive the actuating mechanism. This mechanism comprises a rod or shaft 5 as its primary member and which runs the full length through said barrel and through both ends as shown. The camera shutter arm $a$ is operated by disk $d$ fixed on the end of the said rod, and a link 2 is eccentrically engaged with said disk at one end and with the said shutter arm $a$ at the other end, so that when said rod is rotated the arm $a$ will be moved accordingly. A half rotation or turn of the said rod axially is provided for in a single actuation by the trigger, and is all the arm $a$ requires to open the camera shutter, and the said shutter closes automatically and instantly after operation unless a time exposure be made. The two movements of the trigger do the work. The front end of rod or shaft 5 is centered in a thimble 7, or the like, fixed in the end of barrel $b$ next within the said disk $d$ and having a sleeve for the shaft, and otherwise the said rod 5 is supported and axially rotatable in the studs 8 and 9 and in the stud 10 integral with the top of the slidable actuating member or part A and in the socket at its rear end. The said part or member carries the grip or trigger $g$ as an integral or affixed portion thereof and is slidable in the barrel by means of the trigger $g$ which projects through a comparatively short slot 15 lengthwise in the bottom of barrel $b$, and is slidable therein to rotate rod 5 a half turn as required. At its rear end the said rod is socketed and held against axial thrust in a thimble 16 seated in a cavity in the stock $s$, and at the front end has a collar 18 adjustably fixed thereon and which bears against the sleeve on thimble 7 and takes the endwise thrust in that direction.

The spring 20 lies between the studs 8 and 9, and the barrel 21 rotates in the internally threaded stud 9 and has its stop against stud 10. However, while the spring bears directly against stud 8 at one end, it bears against a sleeve 22 on said shaft at the other end and in which the shaft is free to turn. The said sleeve has an enlarged portion or head $h'$ at its rear provided with a flat sided lug $k$ at its bottom slidably engaged in a slot $s'$ lengthwise in the top of actuating member A and which also holds said sleeve against rotation, and the head of the sleeve has two rounded projections or beads 24 oppositely in its face adapted to engage in or with corresponding cavities in the face of collar 25 fixed on shaft 5 next to said head.

An externally threaded barrel 21 is mounted on shaft 5 and engaged in the nut 9 and has one or more clutch teeth $t$ at its rear end adapted to engage the extremities of pin 26 in or through shaft 5. It follows that as the part A is drawn back by the finger grip $g$ the barrel 21 will be rotated and clutch a tooth on the end of the barrel caused to engage the pin 26 and rotate the shaft or rod 5 accordingly. Thus the direct or linear movement of part A by trigger $g$ is converted into a rotary movement in shaft 5 through barrel 21.

As this occurs the collar 25 on said shaft is forcibly rotated out of engagement with the beads 24, and when it has taken a half turn comes into engagement again with said beads under the pressure of spring 20 against sleeve 22 and further rotation of shaft or rod 5 is arrested.

In operation the first and immediate effect of a pull on the finger grip or trigger $g$ is to cause engagement of the clutch teeth on barrel 21 with pin 26 on the shaft. Then a further movement of the grip or trigger and the nut 9 therewith rotates the barrel 21 and said shaft a half turn which coincides with the half turn of collar 25 in respect to the beads 24, as described, and the movement is brought to a stop; meantime the camera shutter is operated as described.

Figs. 2 and 3 represent the same invention as in the other views with the difference that these views show a pistol instead of a rifle or gun shaped support, and the camera is permanently built upon or with the barrel and constitutes a fixed portion of the complete article of maufacture and sale instead of parts separable as in Fig. 1. In Fig. 2 $h$ represents the handle of the support or pistol and there is a somewhat differently-shaped camera $c'$ from that shown in Fig. 1. Both supports have sights $n$ and $m$ respectively, and when the object is "sighted" the trigger $g$ is pulled as in an ordinary rifle and the picture is taken centrally of the film if the sighting is accurate. Any preferred form or style of sights may be employed.

What I claim is:

1. A support for a camera having a tubular barrel and a stock thereon to handle the same and a camera fixed on said barrel having a shutter controlling projection, and a rotatable shaft in said barrel operatively engaged with said projection.

2. A camera having a shutter arm, a gun-shaped support on which the camera is engaged and means in the barrel of said support operatively engaged with said shutter arm comprising a shaft and means to rotate the same within fixed limits.

3. A support for a camera comprising a tubular barrel provided with sights and a stock to handle the same, in combination with means in said barrel to actuate a camera shutter comprising a rotatable shaft extending through the front end of said barrel, and means operatively connected therewith to partially rotate the said shaft, said means having a trigger exposed at the bottom of the barrel.

4. The device described comprising a tubular barrel, a rotatable shaft projecting through said shaft at its ends, a slidable part in said barrel having a finger controlled extension beneath the barrel and a nut on its top, an externally threaded member sleeved on said shaft and engaged in said nut, means to engage said member with said shaft and a spring adapted to restore said parts to starting position.

5. The device described comprising a camera support having a tubular barrel and a camera thereon having a shutter controlling projection, in combination with a rotatable shaft in said barrel operatively engaged with said projections, means to rotate said shaft and means to stop said shaft at a half rotation.

6. The device described comprising a gun shaped support having a barrel, a camera on the front end of said barrel having a shutter arm, in combination with a rotatable rod carried by said barrel and operatively engaged with said arm, means to rotate said rod and means to limit said rotation comprising a spring pressed sleeve on said rod and a fixed collar on said rod adapted to engage and disengage on their opposed faces.

7. The support described having a barrel and a camera thereon, in combination with a rotatable shaft operatively engaged with said camera, and means to operate said shaft comprising a part having a trigger and a nut thereon, a clutch barrel engaged in said nut and a pin on said shaft adapted to be clutched by said clutch barrel.

Signed at Cleveland, in the county of Cuyahoga, and State of Ohio, this 16'' day of October, 1916.

AUGUST C. RUTZEN.